US012088020B2

(12) United States Patent
Hsu et al.

(10) Patent No.: US 12,088,020 B2
(45) Date of Patent: Sep. 10, 2024

(54) ANTENNA STRUCTURE AND ELECTRONIC DEVICE USING SAME

(71) Applicant: Chiun Mai Communication Systems, Inc., New Taipei (TW)

(72) Inventors: Cho-Kang Hsu, New Taipei (TW); Min-Hui Ho, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 223 days.

(21) Appl. No.: 17/709,831

(22) Filed: Mar. 31, 2022

(65) Prior Publication Data

US 2022/0399645 A1 Dec. 15, 2022

(30) Foreign Application Priority Data

Jun. 10, 2021 (CN) ......................... 202110649711.1

(51) Int. Cl.

*H01Q 5/35* (2015.01)
*H01Q 1/24* (2006.01)
*H01Q 1/50* (2006.01)

(52) U.S. Cl.

CPC ............... *H01Q 5/35* (2015.01); *H01Q 1/243* (2013.01); *H01Q 1/50* (2013.01)

(58) Field of Classification Search

CPC ................................. H01Q 5/35; H01Q 1/243
USPC .......................................................... 343/725
See application file for complete search history.

(56) References Cited

U.S. PATENT DOCUMENTS

| | | | | |
|---|---|---|---|---|
| 2014/0139379 A1 | 5/2014 | Bolin et al. | | |
| 2017/0110787 A1* | 4/2017 | Ouyang | H01Q 1/42 |
| 2018/0026360 A1* | 1/2018 | Lee | H01Q 5/328 343/872 |
| 2023/0352854 A1* | 11/2023 | Wu | H01Q 23/00 |
| 2023/0361449 A1* | 11/2023 | Hsu | H01Q 21/28 |
| 2023/0361467 A1* | 11/2023 | Wu | H01Q 1/243 |
| 2023/0361487 A1* | 11/2023 | Hsu | H01Q 1/38 |
| 2023/0395970 A1* | 12/2023 | Kim | H04M 1/026 |

FOREIGN PATENT DOCUMENTS

| | | |
|---|---|---|
| CN | 103794866 B | 7/2016 |
| CN | 110233328 A | 9/2019 |
| CN | 110931944 A | 3/2020 |
| CN | 112382845 A | 2/2021 |
| CN | 12909542 A | 6/2021 |
| TW | 202023108 A | 6/2020 |

* cited by examiner

*Primary Examiner* — Graham P Smith
(74) *Attorney, Agent, or Firm* — ScienBiziP, P.C.

(57) ABSTRACT

An antenna structure is applicable in an electronic device having a metal frame. At least one slot is defined in the metal frame. The antenna structure includes a first radiating portion, a second radiating portion, and an antenna module. The first radiating portion and the second radiating portion are portions of the metal frame. The second radiating portion is separated from the first radiating portion with the at least one slot. The antenna module is spaced from an inner side of the metal frame. A projection of the antenna module is partially overlapping a projection of the first radiating portion or a projection of the second radiating portion in a predetermined direction, the antenna structure excites a plurality of radiation modes. The application also provides an electronic device with the antenna structure.

20 Claims, 18 Drawing Sheets

ANTENNA STRUCTURE AND ELECTRONIC DEVICE USING SAME

CROSS-REFERENCE TO RELATED APPLICATIONS

This application claims priority to Chinese Patent Application No. 202110649711.1 filed on Jun. 10, 2021, in China State Intellectual Property Administration, the contents of which are incorporated by reference herein.

TECHNICAL FIELD

The present disclosure relates to the field of wireless communication technology, in particular to antenna structure and electronic device having the antenna structure.

BACKGROUND

With the advancement of wireless communication technology, electronic devices such as mobile phones continue to become more diversified functions, thinner and lighter, and faster and more efficient in data transmission. The space in mobile phones that can accommodate antennas is becoming smaller, and with the continuous development of wireless communication technology, the demand for antenna bandwidth continues to increase. How to design an antenna with a wider bandwidth and higher efficiency in a limited space is an important issue facing antenna design.

Therefore, there is a room for improvement.

DETAILED DESCRIPTION

Figure 1:
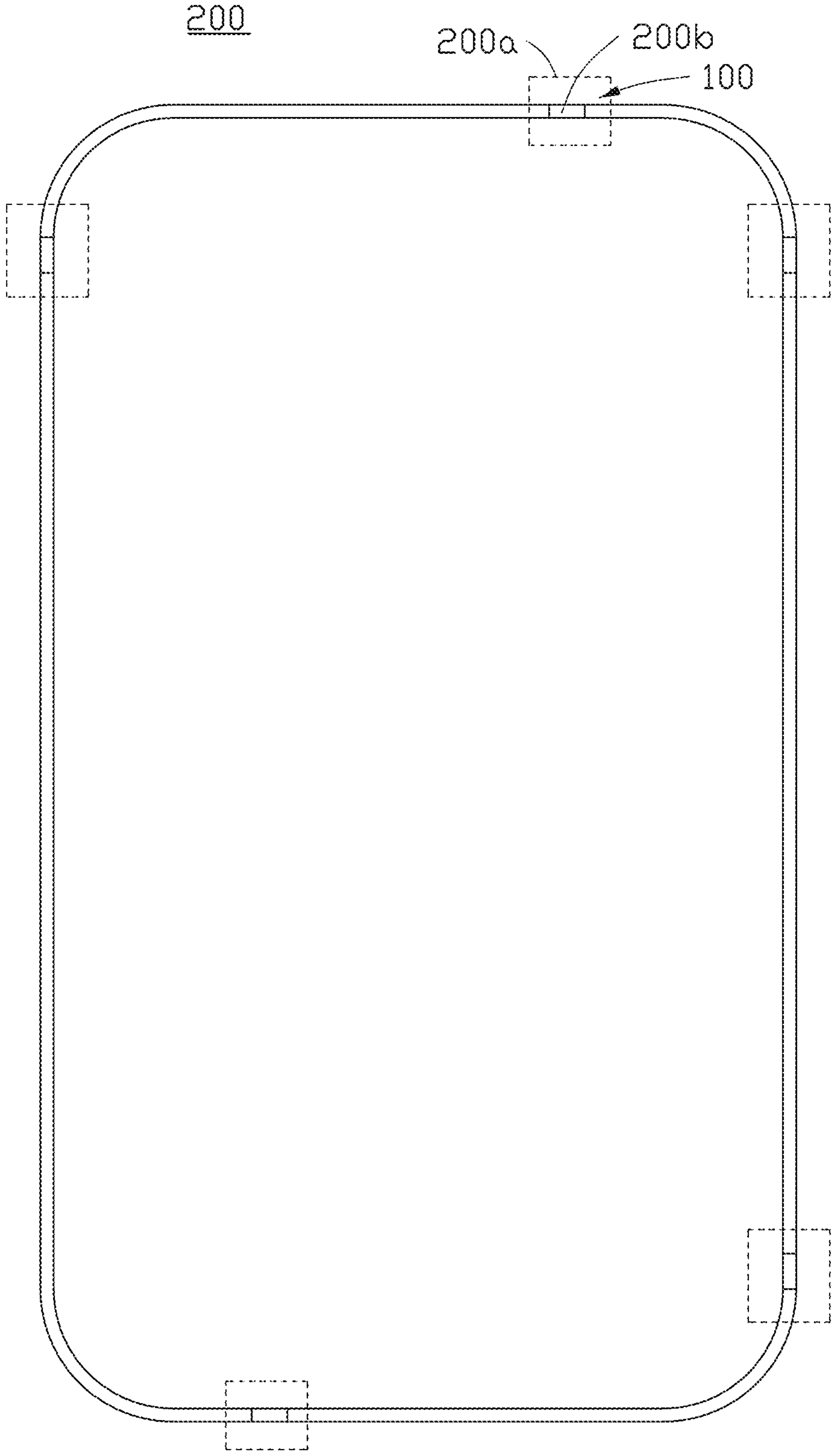
FIG. 1 is a schematic diagram of an antenna structure used in an electronic device of at least one embodiment of the present disclosure.

In order to make the purpose, technical solutions and advantages of the embodiments of the present disclosure clearer, the technical solutions in the embodiments of the present disclosure will be described clearly and completely in conjunction with the drawings in the embodiments of the present disclosure. Based on the embodiments of the present disclosure, all other embodiments obtained by those of ordinary skill in the art without creative work shall fall within the scope of protection of the present disclosure.

Those skilled in the art should understand that, in the disclosure of the present disclosure, "at least one" refers to one or more, and multiple refers to two or more. Unless otherwise defined, all technical and scientific terms used herein have the same meaning as commonly understood by those skilled in the technical field in the present disclosure. The terminology used in the specification of present disclosure is only for the purpose of describing specific embodiments, and is not intended to limit the present disclosure.

It can be understood that, unless otherwise specified in the present disclosure, "/" means "or". For example, AB can mean A or B. "A and/or B" in the present disclosure is only an associative relationship describing the associated objects, which means that there can be three relationships: only A, only B, and A and B.

It can be understood that, in the disclosure of the present disclosure, the words such as "first" and "second" are only used for the purpose of distinguishing description, and cannot be understood as indicating or implying relative importance, nor as indicating or implying any order. The features defined with "first" and "second" may explicitly or implicitly include one or more of the features. In the description of the embodiments of the present disclosure, the words such as "exemplary" or "for example" are used as examples, illustrations, or indications. Any embodiment or design solution described as "exemplary" or "for example" in the embodiments of the present disclosure should not be construed as being more preferable or advantageous than other embodiments or design solutions. To be precise, the words such as "exemplary" or "for example" are used to present related concepts in a specific manner.

Those skilled in the art should understand that, in the disclosure of the present disclosure, the terms "longitudinal", "lateral", "upper", "lower", "front", "rear", "left", "right", the orientation or positional relationship indicated by "vertical", "horizontal", "top", "bottom", "inner", "outer", etc. are based on the orientation or positional relationship shown in the drawings, which is only for the convenience of describing the present disclosure and to simplify the description, rather than indicating or implying that the device or element referred to must have a specific orientation, or be constructed and operated in a specific orientation, so the above terms should not be understood as limiting the present disclosure.

Figure 2:
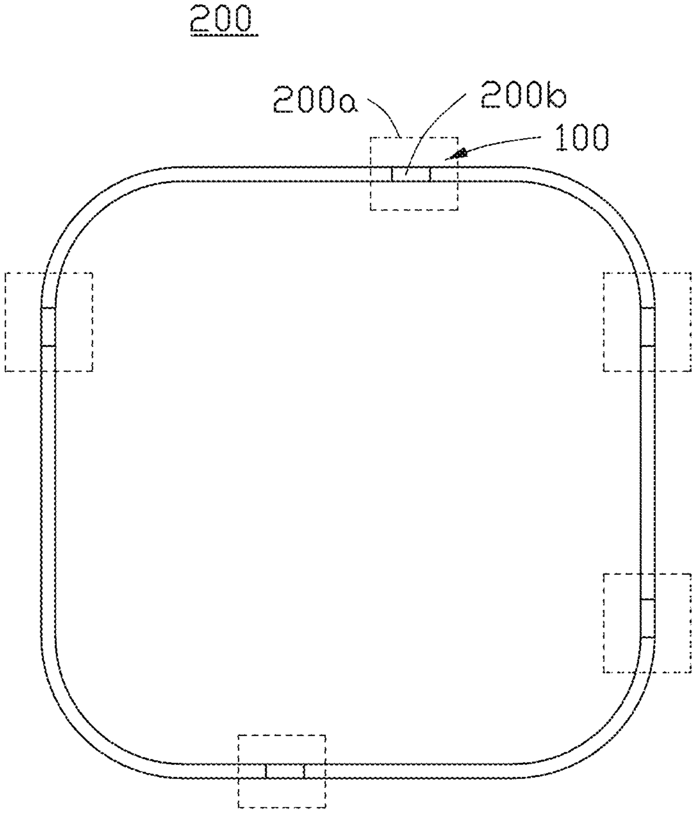
FIG. 2 is a schematic diagram of the antenna structure applied to another electronic device of at least one embodiment of the present disclosure.
Figure 3:
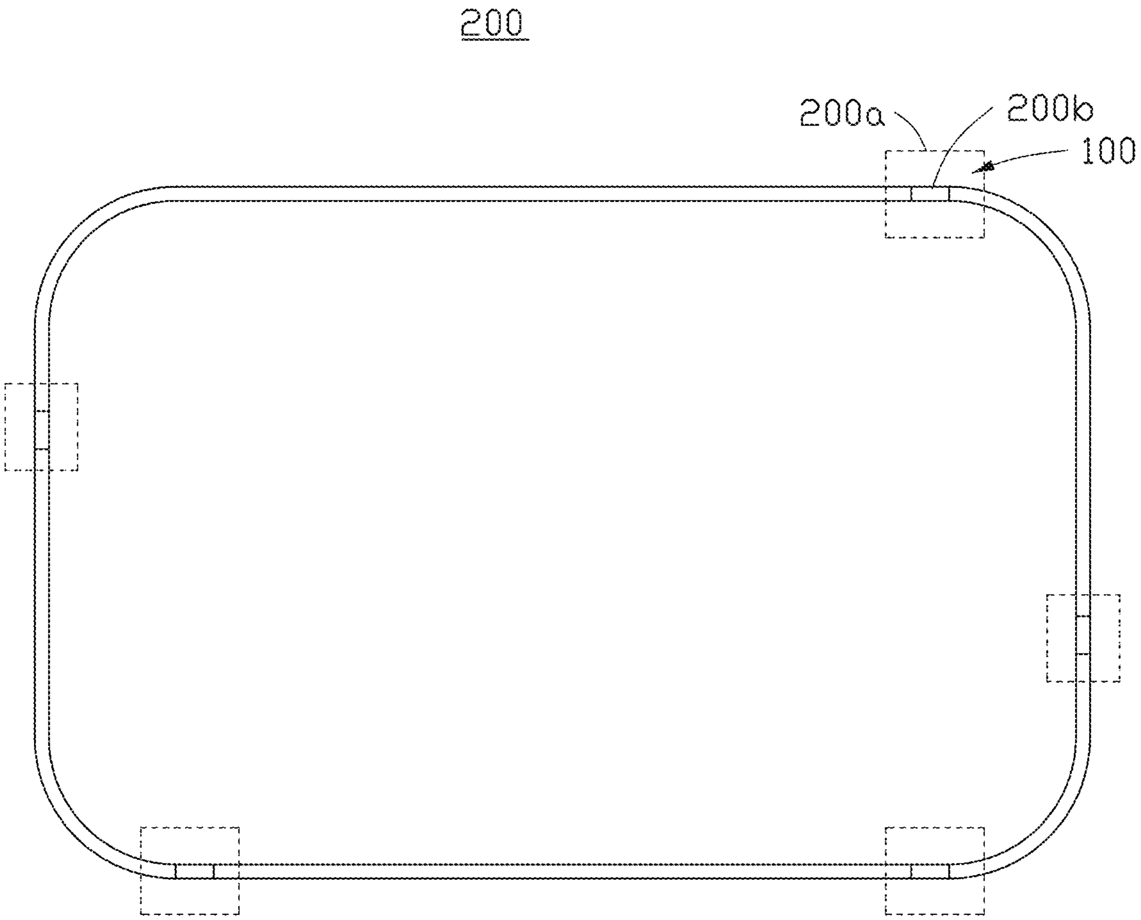
FIG. 3 is a schematic diagram of the antenna structure applied to another electronic device of at least one embodiment of the present disclosure.

FIGS. 1, 2, and 3 illustrate an antenna structure 100 applied in an electronic device 200 in accordance with at least one embodiment of the present disclosure, which is configured to transmit and receive radio waves and exchange wireless signals. The electronic device 200 may be a handheld communication device (such as a mobile phone), a folding machine, a smart wearable device (such as a watch, earphone, etc.), a tablet computer, a personal digital assistant (personal digital assistant, PDA), a display device, a gaming machine, not specifically limited here.

For instance, referring to FIG. 1, for the antenna structure 100 applied in the electronic device 200, the electronic device 200 may be a mobile phone. Referring to FIG. 2, for the antenna structure 100 applied in the electronic device 200, the electronic device 200 may be a smart watch. Referring to FIG. 3, for the antenna structure 100 applied in the electronic device 200, the electronic device 200 may be a tablet computer. Referring to FIGS. 1 to 3, the antenna structure 100 may be arranged in an area 200*a* as shown in the figures. The area 200*a* may be areas or positions where the electronic device 200 defines a slot 200*b*.

The electronic device 200 may adopt one or more of the following communication technologies: BLUETOOTH (BT) communication technology, global positioning system (GPS) communication technology, WI-FI communication technology, global system for mobile communications (GSM) communication technology, wideband code division multiple access (WCDMA) communication technology, long term evolution (LTE) communication technology, 5G communication technology, SUB-6G communication technology and other future communication technologies.

In the embodiment of the present disclosure, the electronic device 200 is a mobile phone as an example for description.

Figure 4:
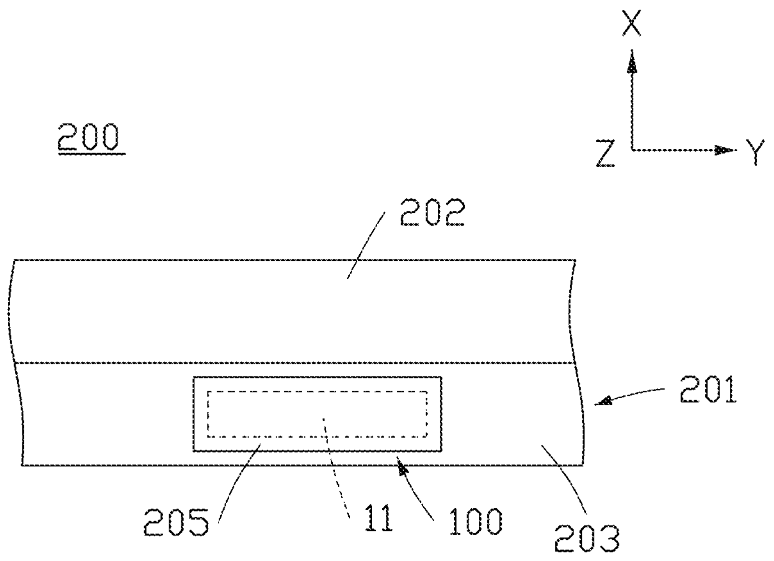
FIG. 4 is a schematic diagram of a side view of the electronic device of the embodiment of the present disclosure.

Referring to FIG. 4, in at least one embodiment, the electronic device 200 includes a housing 201 and a display unit 202. The housing 201 includes a frame 203 and a backplane 204 (shown in FIG. 5). The frame 203 is made of metal or other conductive materials. A notch 205 is defined on the frame 203.

Figure 5:
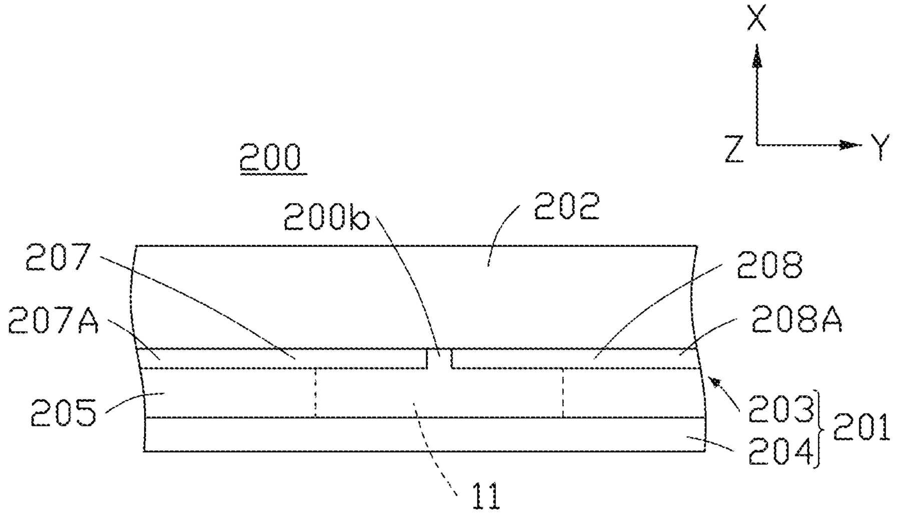
FIG. 5 is a schematic diagram of another side view of the electronic device of the embodiment of the present disclosure.

Referring to FIG. 5, the backplane 204 may be made of metal or other conductive materials. The frame 203 is disposed on the edge of the backplane 204 and forms an accommodating space 206 together with the backplane 204. An opening (not shown in the figures) is provided on the side of the frame 203 opposite to the backplane 204 for accommodating the display unit 202. The display unit 202 has a display plane, and the display plane is exposed at the opening. It can be understood that the display unit 202 can be combined with a touch sensor to form a touch screen. The touch sensor can also be called touch panel or touch sensitive panel.

In the embodiment of the present disclosure, the display unit 202 has a high screen-to-body ratio. That is, the area of the display plane of the display unit 202 is greater than 70% of the total frontal area of the electronic device 200, and even a front full screen can be achieved. Specifically, in the embodiment of the present disclosure, the full screen means that except for the necessary slots opened on the electronic device 200, the left, right, and lower sides of the display unit 202 can be seamlessly connected to the frame 203.

Referring to FIG. 4, in at least one embodiment, the antenna structure 100 includes an antenna module 11. The antenna module 11 is arranged in the housing 201 and corresponds to the notch 205.

In at least one embodiment, the antenna module 11 may be a 5G millimeter wave (mmWave) antenna, which may activate a frequency mode of 28 GHz (with a frequency range from about 27.5 to 28.35 GHz) and a frequency mode of 39 GHz (with a frequency range from about 37 to 40 GHz).

In at least one embodiment, the antenna module 11 is spaced from an inner side of frame 203. For instance, in at least one embodiment, the antenna module 11 is spaced from but parallel to the frame 203. In another embodiment, the antenna module 11 is spaced from and not parallel to the frame 203. However, a distance between the antenna module 11 and the frame 203 may be adjusted according to required transmission frequency.

In at least one embodiment, the antenna module 11 may be aligned with the notch 205. The notch 205 may be filled with insulating materials, such as plastic, rubber, glass, wood, ceramics, not being limited. In addition, the notch 205 may shield or partially shield the antenna module 11. For instance, in at least one embodiment, a size of the notch 205 is greater or equal to a size of the antenna module 11, a projection of the notch 205 in a first direction (such as a Z-axis shown in the figures) may fully cover a projection of the antenna module 11 in the first direction. At this time, a metal portion of the frame (such as a first portion 207A and/or a second portion 208A) does not shield the antenna module 11. In another embodiment, the size of the notch 205 is smaller than the size of the antenna module 11, the projection of the notch 205 in the first direction may provide partial covering of the projection of the antenna module 11 in the first direction. At this time, the metal portion of the frame (such as a first portion 207A and/or a second portion 208A as shown in FIG. 5) may partially shield the antenna module 11. Otherwise, in another embodiment, even though the size of the notch 205 is greater than or equal to the size of the antenna module 11, the projection of the notch 205 in the first direction may partially shield the projection of the antenna module 11 in the first direction. At this time, the metal portion of the frame (such as a first portion 207A and/or a second portion 208A) may partially shield the antenna module 11.

Referring to FIG. 5, in at least one embodiment, the frame 203 defines a slot 200*b*. The slot 200*b* separates and insulates the first portion 207A and the second portion 208B from the frame 203. In at least one embodiment, the slot 200*b* communicates with the notch 205. The slot 200*b* and the notch 205 are all filled with an insulating material, such as plastic, rubber, glass, wood, ceramic, etc., not being limited. In at least one embodiment, a width of the slot 200*b* may be about 1-2 mm.

In at least one embodiment, the first portion 207A and the second portion 208A do not serve as independent antenna radiators. When the first portion 207A and the second portion 208A do not serve as independent antenna radiators, the antenna module 11 may couple signals to the first portion 207A and the second portion 208A, that is, the first portion 207A and the second portion 208A may radiate signals in a coupled manner. That means the first portion 207A and the second portion 208A may serve as coupling radiators. In at least one embodiment, coupling distances between the antenna module 11 and the first and second portions 207A and 208A may be adjusted according to required impedances, to achieve maximum frequency band and optimal efficiency.

In at least one embodiment, the first portion 207A and the second portion 208A may use different feeding sources, so as to serve as independent antenna radiators, for example, a first radiating portion 207 and a second radiating portion 208, to further be operated in predetermined frequency bands.

In another embodiment, the first portion 207A and the second portion 208A do not serve as antenna radiators, that is, are not coupled and do not radiate any signals.

Figure 6:
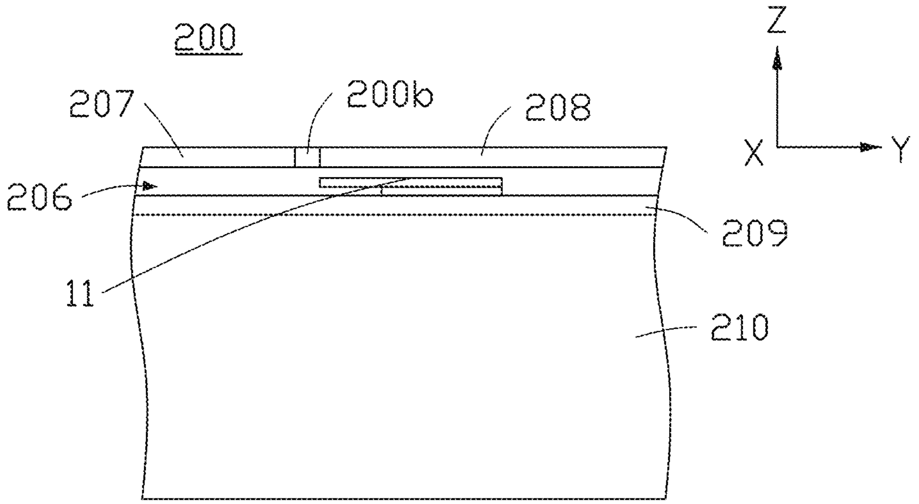
FIG. 6 is a schematic diagram of the electronic device shown in FIG. 5 from another angle.
Figure 7:
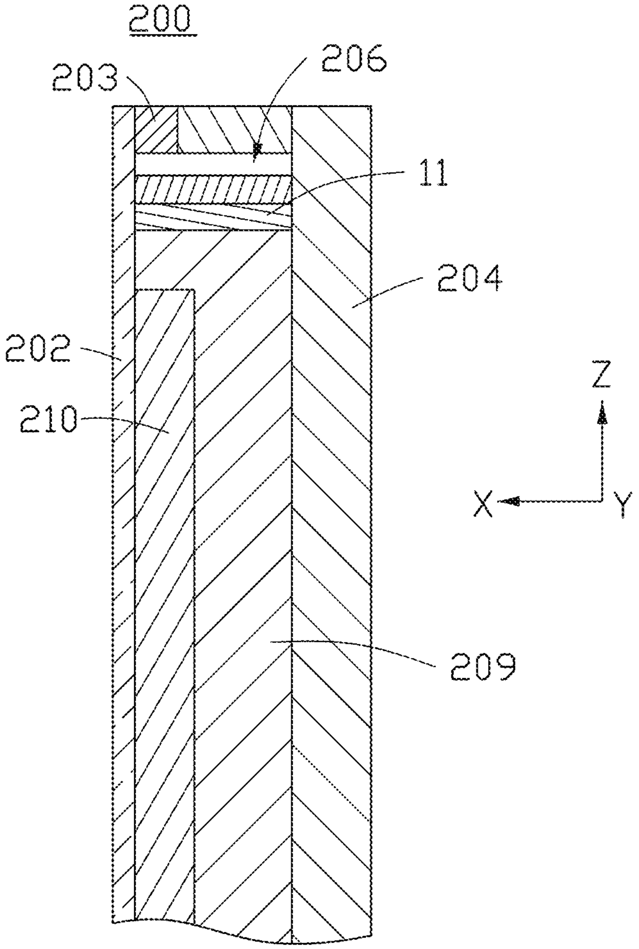
FIG. 7 is a cross-sectional schematic diagram of the electronic device shown in FIG. 5.

FIG. 6 is a schematic diagram of the electronic device 200 from another angle. FIG. 7 is a cross-sectional schematic diagram of the electronic device 200. The housing 201 of the electronic device 200 further includes a ground plane 209 and a middle frame 210.

The ground plane 209 may be made of metal or other conductive materials. The ground plane 209 can be disposed in the accommodating space 206 enclosed by the frame 203 and the backplane 204, and is connected to the backplane 204.

The middle frame 210 is made of metal or other conductive materials. The shape and size of the middle frame 210 can be smaller than the ground plane 209. The middle frame 210 is stacked on the ground plane 209. In this embodiment, the middle frame 210 is a metal sheet disposed between the display unit 202 and the ground plane 209. The middle frame 210 supports the display unit 202, provides electromagnetic shielding, and improves the mechanical strength of the electronic device 200.

In at least one embodiment, the frame 203, the backplane 204, the ground plane 209, and the middle frame 210 may be an integrally formed metal frame. The back plane 204, the ground plane 209, and the middle frame 210 are made of metal with large area, so they can jointly form the system ground plane of the electronic device 200 (not shown in the figures).

In other embodiments, the electronic device 200 may also include one or more components, such as a processor, a circuit board, a memory, an input and output circuit, an audio component (such as a microphone and a speaker), and a multimedia component (such as a front camera and/or a rear camera), sensor components (such as proximity sensors, distance sensors, ambient light sensors, acceleration sensors, gyroscopes, magnetic sensors, pressure sensors and/or temperature sensors).

Figure 8:
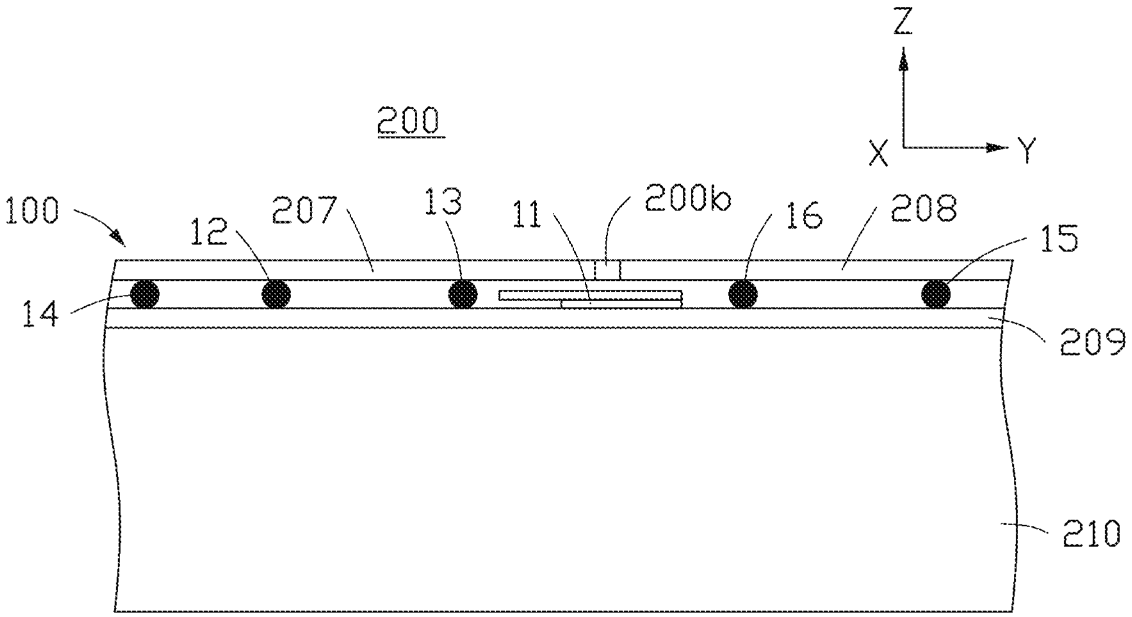
FIG. 8 is another schematic diagram of the electronic device shown in FIG. 5.

Referring to FIG. 8, the antenna structure 100 further includes a first feed source 12, a connecting portion 13, a switching unit 14, a second feed source 15, and a ground portion 16.

In at least one embodiment, the first feed source 12 may be a monopole feed source. The first feed source 12 may be arranged on an inner side of the first radiating portion 207. One end of the first feed source 12 may be electrically connected to the first radiating portion 207, by means of an elastic sheet, a microstrip line, a strip line, or a coaxial cable, for feeding current and signals to the first radiating portion 207, which activates the first radiating portion 207 as an antenna radiator. Another end of the first feed source 12 is grounded.

The connecting portion 13 may be arranged on an inner side of the first radiating portion 207. The connecting portion 13 may be a ground portion or a middle band conditioner (MBC). The MBC may be an inductor and/or a capacitor. The connecting portion 13 may be arranged at a position of the first radiating portion 207 close to the slot 200*b*. One end of the connecting portion 13 is electrically connected to the first radiating portion 207, the other end of the connecting portion 13 is grounded. When the connecting portion 13 is the MBC, the connecting portion 13 may adjust a middle frequency band of the first radiating portion 207, so as to improve the frequency width and antenna efficiency.

The switching unit 14 may be arranged on an inner side of the first portion 207. The switching unit 14 is spaced from the first feed source 12 and the connecting portion 13, the switching unit 14 is arranged on a side of the first feed source 12 away from the connecting portion 13. One end of the switching unit 14 is electrically connected to the first radiating portion 207, the other end of the switching unit 14 is grounded and configured to switch between low frequency modes of the first radiating portion 207.

The second feed source 15 may be a monopole feed source. The second feed source 15 may be arranged on an inner side of the second radiating portion 208. One end of the second feed source 15 may be electrically connected to the second radiating portion 208, by means of an elastic sheet, a microstrip line, a strip line, or a coaxial cable, for feeding current and signals into the second radiating portion 208, which results in the second radiating portion 208 forming an antenna radiator. Another end of the second feed source 15 is grounded.

The ground portion 16 may be arranged on an inner side of the second portion 208. The ground portion 16 may be arranged between the connecting portion 13 and the second feed source 15, the ground portion 16 is closer than the second feed source 15 to the slot 200*b*. One end of the ground portion 16 is electrically connected to the second radiating portion 208, the other end of the ground portion 16 is grounded.

In at least one embodiment, a projection of the antenna module 11 in a second direction (the second direction is perpendicular to the first direction, such as an X-axis direction as shown in FIG. 5) may be at least partially overlapping the projection of the first radiating portion 207 and/or the second radiating portion 208 in the second direction. For instance, referring to FIG. 6, in at least one embodiment, the projection of the antenna module 11 in the second direction may be fully overlapping the projection of the second radiating portion 208 in the second direction. Referring to FIG. 8, in another embodiment, the projection of the antenna module 11 in the second direction may be overlapping the projection of the first radiating portion 207 and the second radiating portion 208 in the second direction. That is, in the second direction, the first radiating portion 207 and/or the second radiating portion 208 may shield the antenna module 11.

Figure 9:
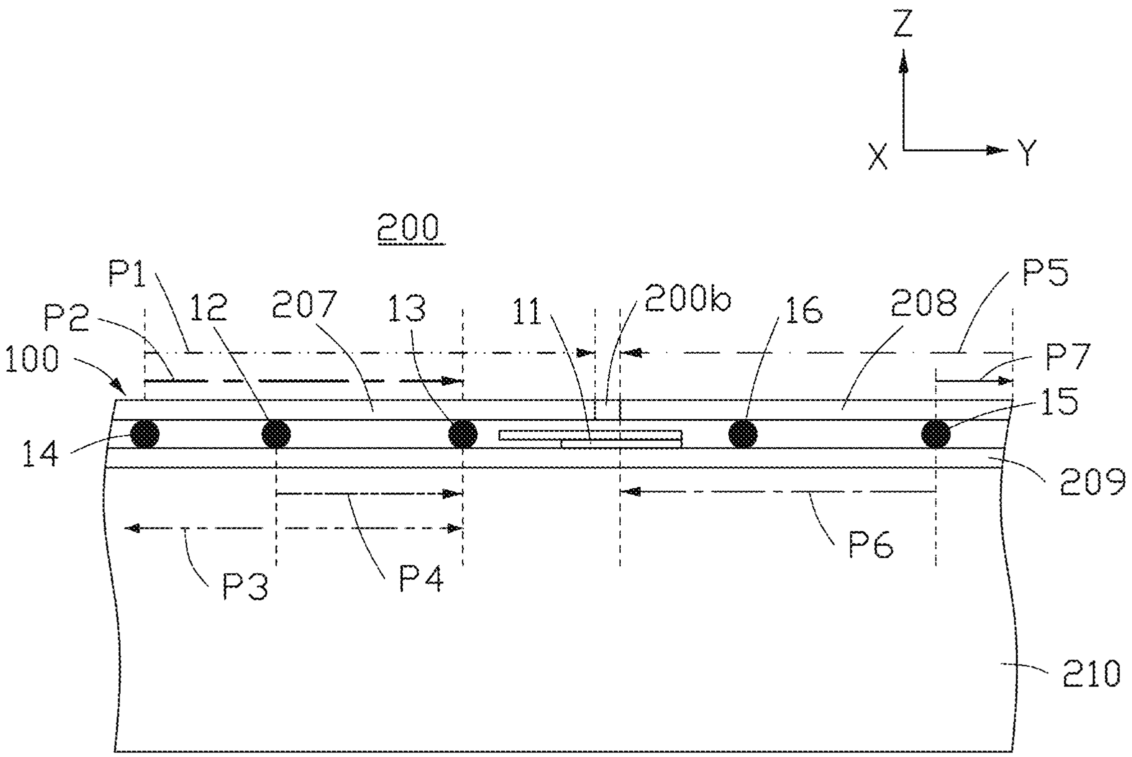
FIG. 9 is a current path distribution graph of the antenna structure of the present disclosure.

FIG. 9 illustrates a current path distribution of the antenna structure 100. The antenna module 11 may be operated in the frequency mode of 28 GHz and the frequency mode of 39 GHz. In particular, the antenna module 11 may arrange 14 groups of scanning beams, for instance, 7 groups of horizontally polarized and 7 groups of vertically polarized radio waves in 0 degree, +/−15 degrees, +/−30 degrees, and +/−45 degrees, so the antenna module 11 may be operated in the frequency mode of 28 GHz and the frequency mode of 39 GHz.

The first portion 207A serves as the first radiating portion 207 of the antenna structure 100, the first radiating portion 207 may be a monopole antenna. When the first feed source 12 supplies a current, the current flows through the first radiating portion 207 via a first matching circuit (not shown in the figures), the current further flows through the switching unit 14, and towards the slot 200*b* (path P1), to excite a first working mode and generate a radiation signal in a first radiation frequency band.

When the first feed source 12 supplies the current, the current flows through the first radiating portion 207 via the first matching circuit, the current further flows through the switching unit 14, and towards the connecting portion 13

(path P2), to excite a second working mode and generate a radiation signal in a second radiation frequency band.

When the first feed source 12 supplies the current, the current flows through the first radiating portion 207 via the first matching circuit, the current further flows through the connecting portion 13 and the switching unit 14 (path P3), to excite a third working mode and generate a radiation signal in a third radiation frequency band.

When the first feed source 12 supplies the current, the current flows through the connecting portion 13 (path P4), to excite a fourth working mode and generate a radiation signal in a fourth radiation frequency band.

In at least one embodiment, the first working mode may be a Long Term Evolution Advanced (LTE-A) low frequency mode. The frequency of the first radiation frequency band may be 700-960 MHz. The second working mode may include an LTE-A middle frequency mode and an LTE-A high frequency mode. The frequencies of the second radiation frequency band may include 1710-2170 MHz and 2300-2690 MHz. The third working mode may include an ultra-high frequency (UHB) mode, a 5G N77 frequency mode, and a 5G N78 frequency mode. The frequencies of the third radiation frequency band may include 3400-3800 MHz, 3300-4200 MHz, and 3300-3800 MHz, that is, 3300-4200 MHz. The fourth working mode may be a 5G N79 frequency mode. The frequency of the fourth radiation frequency band may be 4400-5000 MHz.

In other words, in at least one embodiment, the path P1 may be a radiation current path of the LTE-A low frequency mode. The path P2 may be a radiation current path of the LTE-A middle frequency mode and high frequency mode. The path P3 may be a radiation current path of the ultra-high frequency mode, the 5G N77 frequency mode, and the 5G N78 frequency mode. The path P4 may be a radiation current path of the 5G N79 frequency mode.

Referring to FIG. 8, the second portion 208A serves as the second radiating portion 208 of the antenna structure 100, the second radiating portion 208 may be a loop antenna. When the second feed source 15 supplies a current, the current flows through the second radiating portion 208 via a second matching circuit (not shown in the figures), the current further flows through an end of the second radiating portion 208 (such as a right end shown in the figures), and towards the slot 200*b* (path P5), to excite a fifth working mode and generate a radiation signal in a fifth radiation frequency band.

When the second feed source 15 supplies the current, the current flows through the second radiating portion 208 via the second matching circuit, the current further flows through the ground portion 16, and towards the slot 200*b* (path P6), to excite a sixth working mode and generate a radiation signal in a sixth radiation frequency band.

When the second feed source 15 supplies the current, the current flows through the second radiating portion 208 via the second matching circuit, the current further flows through the end of the second radiating portion 208 (such as the right end as shown in the figures, path P7), to excite a seventh working mode and generate a radiation signal in a seventh radiation frequency band.

In at least one embodiment, the fifth working mode may be a Global Positioning System (GPS) frequency mode. The frequency of the fifth radiation frequency band may be about 1575 MHz. The sixth working mode may be a WIFI 2.4 GHz frequency mode. The frequency of the sixth radiation frequency band may be about 2400-2484 MHz. The seventh working mode may be a WIFI 5 GHz frequency mode. The frequency of the seventh radiation frequency band may be about 5150-5850 MHz.

In other words, in at least one embodiment, the path P5 may be a radiation current path of the GPS frequency mode. The path P6 may be a radiation current path of the WIFI 2.4 GHz frequency mode. The path P7 may be a radiation current path of the WIFI 5 GHz frequency mode.

Figure 10:
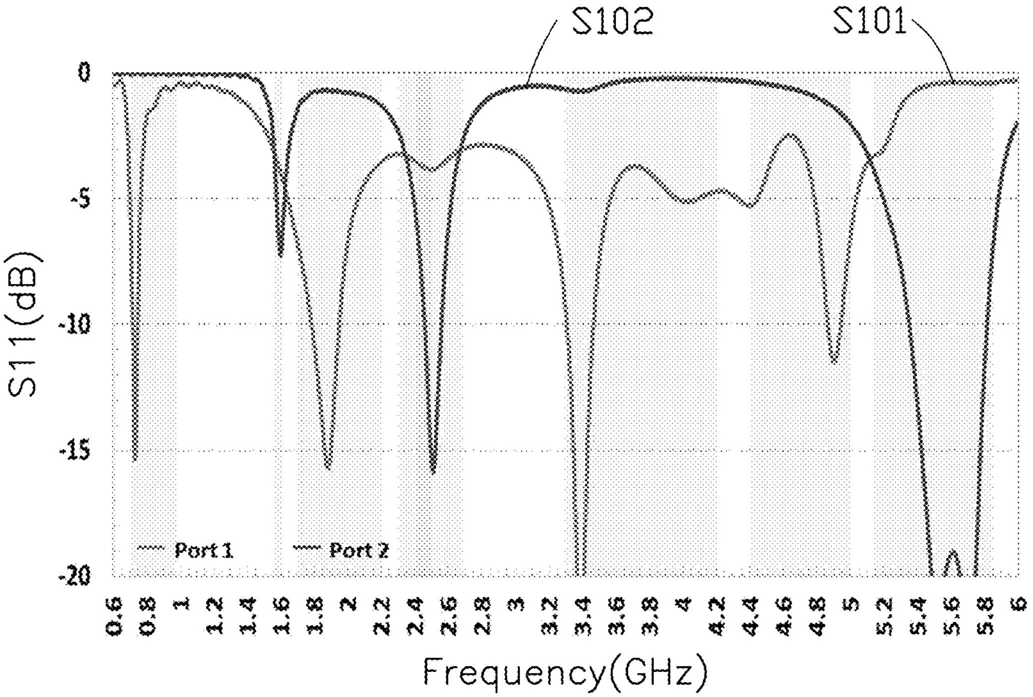
FIG. 10 is a scattering parameter graph of a first radiating portion and a second radiating portion of the antenna structure of the present disclosure.

FIG. 10 is a graph of scattering parameters of the first radiating portion 207 and the second radiating portion 208 of the antenna structure 100. Curve S101 may be an S11 value of the first radiation portion 207. Curve S102 may be an S11 value of the second radiating portion 208.

Figure 11:
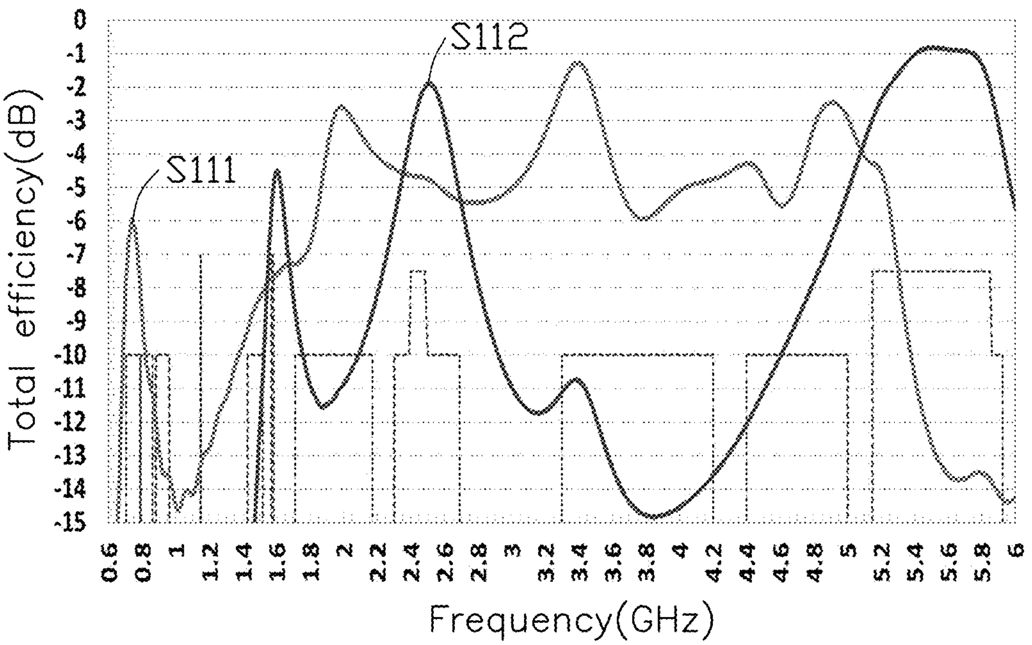
FIG. 11 is a total radiation efficiency graph of the first radiating portion and the second radiating portion of the antenna structure of the present disclosure.

FIG. 11 shows total radiation efficiency of the first radiating portion 207 and the second radiating portion 208 of the antenna structure 100. Curve S111 may be a total radiation efficiency of the first radiation portion 207. Curve S112 may be a total radiation efficiency of the second radiation portion 208.

Figure 12:
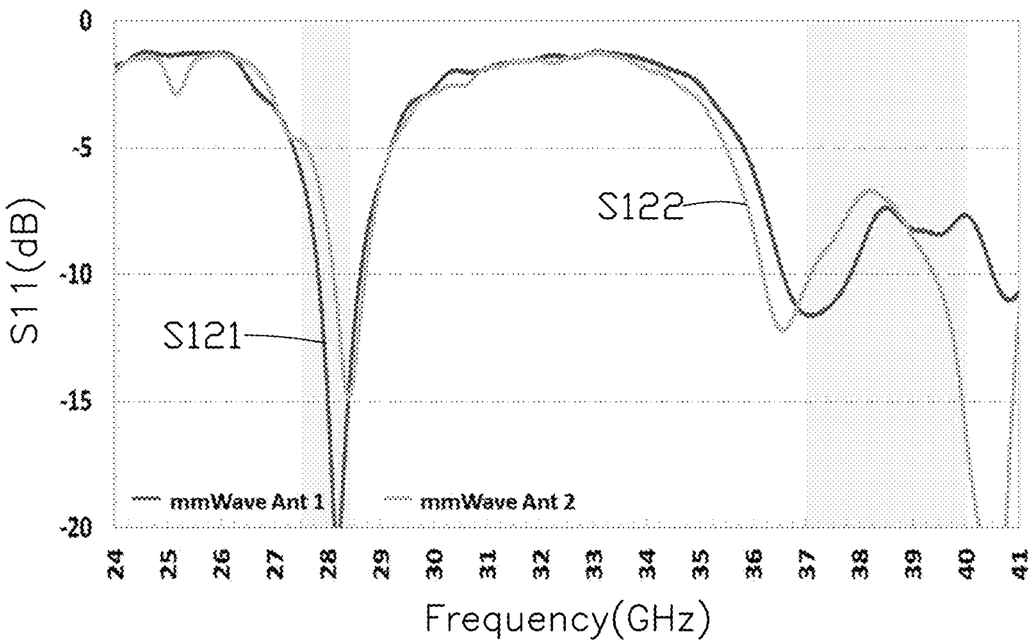
FIG. 12 is a scattering parameter graph of an antenna module of the antenna structure of the present disclosure.

FIG. 12 shows scattering parameters of the antenna module 11 of the antenna structure 100. Curve S121 may be an S11 value of the antenna module 11 when works in the frequency mode of 28 GHz. Curve S122 may be an S11 value of the antenna module 11 when it works in the frequency mode of 39 GHz.

Figure 13:
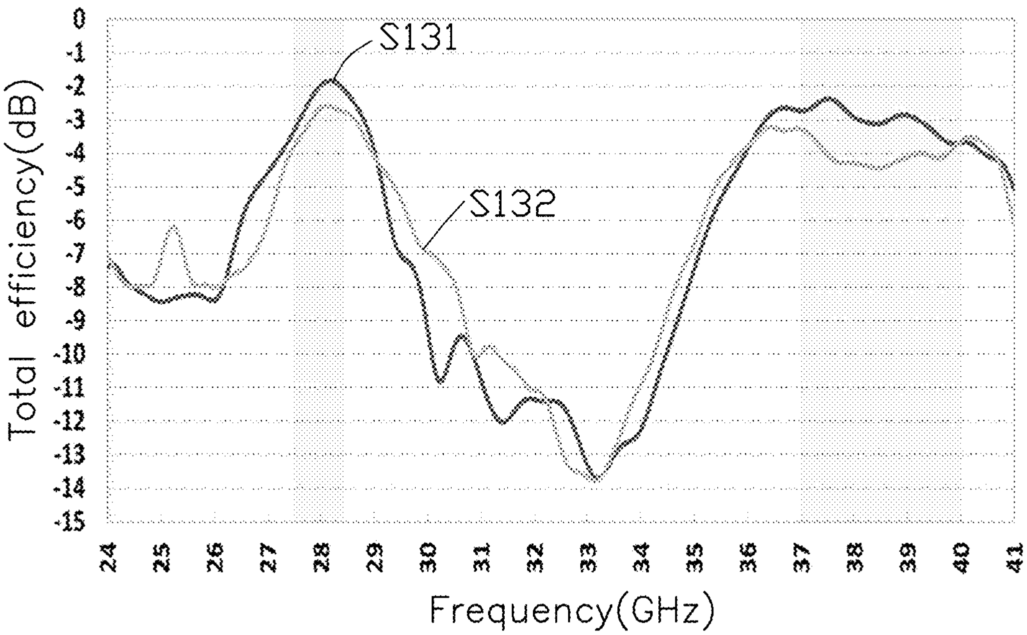
FIG. 13 is a total radiation efficiency graph of the antenna module of the antenna structure of the present disclosure.

FIG. 13 is a total radiation efficiency graph of the antenna module 11 of the antenna structure 100. Curve S131 may be a total radiation efficiency of the antenna module 11 when it works in the frequency mode of 28 GHz. Curve S132 may be a total radiation efficiency of the antenna module 11 when it works in the frequency mode 39 GHz.

Figure 14:
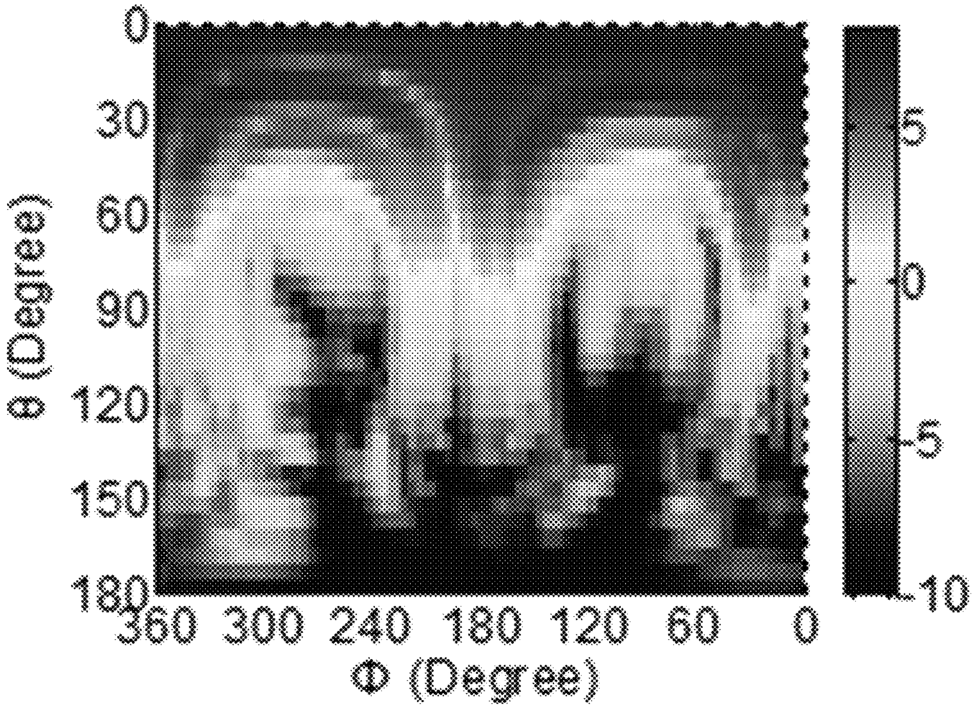
FIG. 14 is a 2D radiation field diagram when the antenna module of the antenna structure works in a 28 GHz mode.
Figure 15:
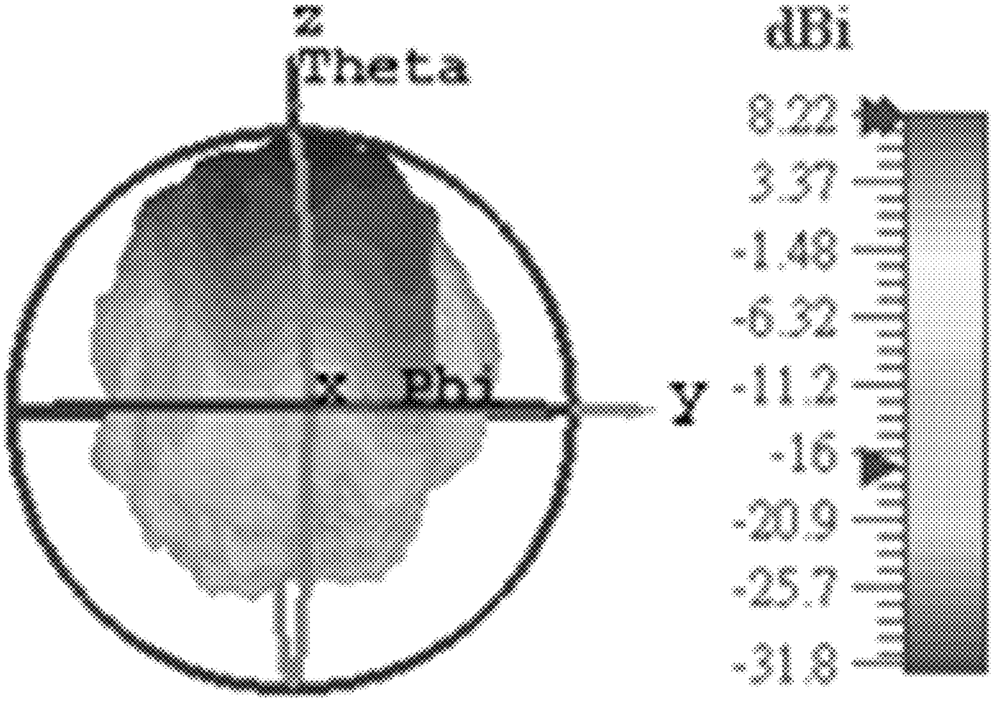
FIG. 15 is a 3D radiation field diagram when the antenna module of the antenna structure works in the 28 GHz mode.

FIGS. 14 and 15 show a 2D radiation field and a 3D radiation field when the antenna module 11 of the antenna structure 100 works in the frequency mode of 28 GHz.

Figure 16:
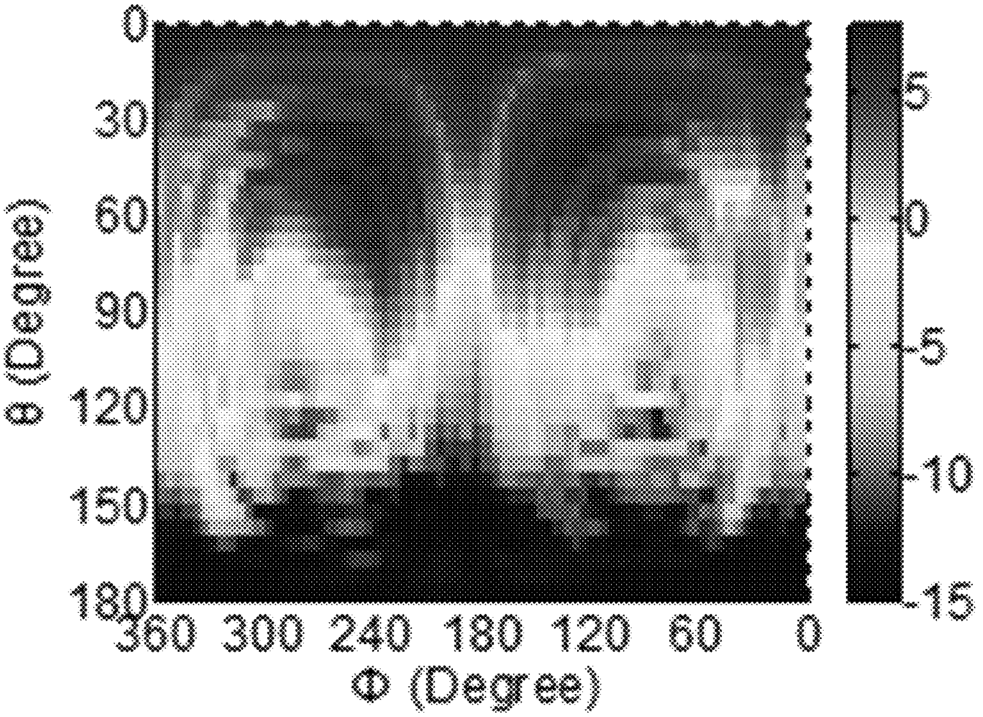
FIG. 16 is a 2D radiation field diagram when the antenna module of the antenna structure works in a 39 GHz mode.
Figure 17:
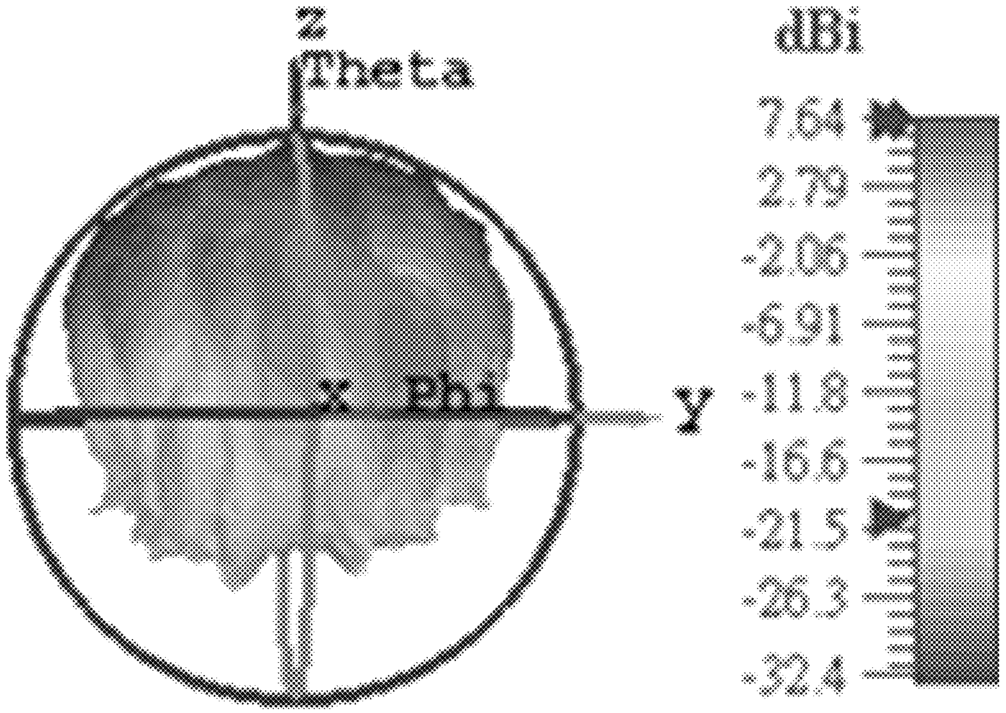
FIG. 17 is a 3D radiation field diagram when the antenna module of the antenna structure works in the 39 GHz mode.

FIGS. 16 and 17 are 2D radiation field and 3D radiation field when the antenna module 11 of the antenna structure 100 works in the frequency mode of 39 GHz.

Figure 18:
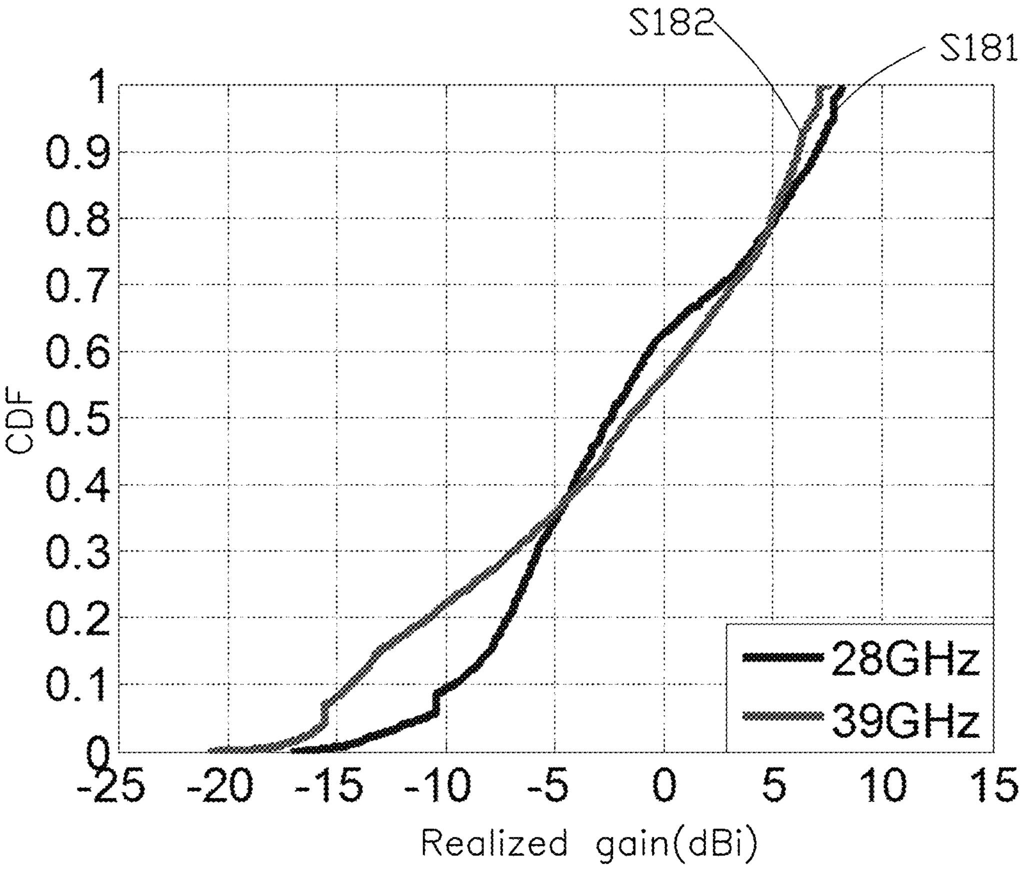
FIG. 18 is a graph of realized gain cumulative distribution function of the antenna module of the antenna structure of the present disclosure.

FIG. 18 shows a realized gain cumulative distribution function (CDF) of the antenna module 11 of the antenna structure 100. Curve S181 may be a realized gain cumulative distribution function of the antenna module 11 when it works in the frequency mode of 28 GHz. Curve S182 may be a realized gain cumulative distribution function of the antenna module 11 when it works in the frequency mode of 39 GHz.

Table 1 is a table of realized gain cumulative distribution function

TABLE 1

| | Antenna module | |
|---|---|---|
| CDF | 28 GHz (n261), realized gain (dBi) | 39 GHz (n260), realized gain (dBi) |
| Max. CDF | 8.2 | 7.6 |
| 80% CDF | 5.1 | 5.0 |
| 50% CDF | −2.4 | −1.6 |
| 20% CDF | −7.2 | −10.8 |

The antenna structure 100 may efficiently improve frequency width and have optimal antenna efficiency. The frequency bands of the antenna structure 100 may cover the LTE-A low-frequency, middle-frequency, high-frequency, ultra-high frequency, 5G N77, 5G N78, 5G N79, GPS, WIFI 2.4 GHz, WIFI 5 GHz, 5G 28 GHz, and 5G 39 GHz frequency bands, which may greatly improve a frequency bandwidth and antenna efficiency and cover global frequency bands, and be beneficial to a carrier aggregation application (CA) of LTE-A.

That is, the antenna structure 100 may generate various working modes, such as low-frequency mode, middle-frequency mode, high-frequency mode, ultra-high frequency mode, 5G N77 frequency mode, 5G N78 frequency mode, 5G N79 frequency mode, GPS frequency mode, WIFI 2.4 GHz frequency mode, WIFI 5 GHz frequency mode, 5G 28 GHz frequency mode, and 5G 39 GHz frequency mode, communication bands, as these are commonly used in the world. Specifically, the antenna structure 100 may cover GSM850/900/WCDMA Band 5/Band 8/Band 13/Band 17/Band 20 at low frequencies, GSM 1800/1900/WCDMA 2100 (1710-2170 MHz) at middle frequencies, LTE-A Band 7, Band 40, Band 41 (2300-2690 MHz) at high frequencies, ultra-high frequency bands of 3400-3800 MHz, 5G frequency bands including N77 (3300-4200 MHz), N78 (3300-3800 MHz), N79 (4400-5000 MHz), GPS frequency band (1575 MHz), WIFI 2.4G frequency band (2400-2484 MHz), and WIFI 5G frequency band (5150-5850 MHz). The frequency bands of the antenna structure 100 may be applied to the operation of GSM Qual-band, UMTS Band I/II/V/VIII frequency bands, and LTE 850/900/1800/1900/2100/2300/2500 frequency bands, as are commonly used worldwide.

The antenna structure 100 arranges the antenna module 11 of 5G mmWave spaced from the inner side of from 203 and corresponding to the slot 200*b* defined between the two antenna radiators (that is the first radiating portion 207 and the second radiating portion 208), and the projection of the antenna module 11 in one direction or another may be at least partially overlapping the projection of the first radiating portion 207 and/or the second radiating portion 208 in the direction, that is, the first radiating portion 207 and/or the second radiating portion 208 may shield the antenna module 11. The antenna module 11 may cover 28 GHz frequency band and 39 GHz frequency band (frequency bands of 27.5-28.35 GHz and 37-40 GHz), and not be limited in respect of frequency width and antenna efficiency to the high screen-to-body ratio and high metal coating rate.

In at least one embodiment, the frequency bands of the antenna structure 100 may not be limited to the aforesaid frequency bands. In particularly, a structure, a length, and/or a width of the antenna structure 100 may be adjusted according to required frequencies. That is, the working frequency bands of the antenna structure 100 may be adjusted according to actual demand by adjusting a structure, a length, and/or a width of the antenna structure 100.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An antenna structure applicable in an electronic device, the electronic device having a metal frame, the antenna structure comprising:

at least one slot defined in the metal frame;

a first radiating portion being one portion of the metal frame;

a second radiating portion being another portion of the metal frame and separated from the first radiating portion with the at least one slot;

an antenna module spaced from an inner side of the metal frame, a projection of the antenna module being partially overlapping a projection of the first radiating portion or a projection of the second radiating portion in a predetermined direction, wherein the antenna structure excites a plurality of radiation modes; and a notch defined in the metal frame, the notch positioned correspondingly to the antenna module.

2. The antenna structure according to claim 1, wherein the notch and the at least one slot are filled with an insulating material.

3. The antenna structure according to claim 2, wherein the at least one slot is connected with the notch.

4. The antenna structure according to claim 1, wherein the antenna module is a 5G millimeter wave antenna and configured to excite a frequency mode of 28 GHz and a frequency mode of 39 GHz.

5. The antenna structure according to claim 1, wherein the first radiating portion is configured to excite LTE-A low frequency mode, middle frequency mode, and high frequency mode, an ultra-high frequency mode, a 5G N77 frequency mode, a 5G N78 frequency mode, and a 5G N79 frequency mode, the second radiating portion is configured to excite a GPS frequency mode, a WIFI 2.4 GHz frequency mode, and a WIFI 5 GHz frequency mode.

6. The antenna structure according to claim 1, wherein the first radiating portion and the second radiating portion are coupled by the antenna module to excite respective radiation modes.

7. The antenna structure according to claim 1, further comprising a first feed source and a second feed source, wherein the first feed source is electrically connected to the first radiating portion and configured to feed current signals to the first radiating portion, the second feed source is electrically connected to the second radiating portion and configured to feed current signals to the second radiating portion.

8. The antenna structure according to claim 7, further comprising a connecting portion, wherein the connecting portion is spaced from the first feed source, the connecting portion is a ground portion or a middle band conditioner, one end of the connecting portion is electrically connected to the first radiating portion, the other end of the connecting portion is grounded.

9. The antenna structure according to claim 8, further comprising a switching unit, wherein the switching unit is spaced from the first feed source and the connecting portion, one end of the switching unit is electrically connected to the first radiating portion, the other end of the switching unit is grounded, the switching unit is configured to switch a low frequency mode of the first radiating portion.

10. The antenna structure according to claim 7, further comprising a ground portion, wherein the ground portion is spaced from the second feed source, one end of the ground portion is electrically connected to the second radiating portion, the other end of the ground portion is grounded, the ground portion is configured to ground the second radiating portion.

11. An electronic device comprising:

a metal frame, at least one slot defined in the metal frame; and an antenna structure comprising:

a first radiating portion being one portion of the metal frame;

a second radiating portion being another portion of the metal frame and separated from the first radiating portion with the at least one slot;

an antenna module spaced from an inner side of the metal frame, a projection of the antenna module being partially overlapping a projection of the first radiating portion or a projection of the second radiating portion in a predetermined direction, wherein the antenna structure excites a plurality of radiation modes; and a notch defined in the metal frame, the notch positioned correspondingly to the antenna module.

12. The electronic device according to claim 11, wherein the notch and the at least one slot are filled with an insulating material.

13. The electronic device according to claim 12, wherein the at least one slot is connected with the notch.

14. The electronic device according to claim 11, wherein the antenna module is a 5G millimeter wave antenna and configured to excite a frequency mode of 28 GHz and a frequency mode of 39 GHz.

15. The electronic device according to claim 11, wherein the first radiating portion is configured to excite LTE-A low frequency mode, middle frequency mode, high frequency mode, an ultra-high frequency mode, a 5G N77 frequency mode, a 5G N78 frequency mode, and a 5G N79 frequency mode, the second radiating portion is configured to excite a GPS frequency mode, a WIFI 2.4 GHz frequency mode, and a WIFI 5 GHz frequency mode.

16. The electronic device according to claim 11, wherein the first radiating portion and the second radiating portion are coupled by the antenna module to excite respective radiation modes.

17. The electronic device according to claim 11, wherein the antenna structure further comprises a first feed source and a second feed source, the first feed source is electrically connected to the first radiating portion and configured to feed current signals to the first radiating portion, the second feed source is electrically connected to the second radiating portion and configured to feed current signals to the second radiating portion.

18. The electronic device according to claim 17, wherein the antenna structure further comprises a connecting portion, the connecting portion is spaced from the first feed source, the connecting portion is a ground portion or a middle band conditioner, one end of the connecting portion is electrically connected to the first radiating portion, the other end of the connecting portion is grounded.

19. The electronic device according to claim 18, wherein the antenna structure further comprises a switching unit, the switching unit is spaced from the first feed source and the connecting portion, one end of the switching unit is electrically connected to the first radiating portion, the other end of the switching unit is grounded, the switching unit is configured to switch a low frequency mode of the first radiating portion.

20. The electronic device according to claim 17, wherein the antenna structure further comprises a ground portion, the ground portion is spaced from the second feed source, one end of the ground portion is electrically connected to the second radiating portion, the other end of the ground portion is grounded, the ground portion is configured to ground the second radiating portion.

* * * * *